April 29, 1952 — F. Y. KURIYAMA — 2,595,085
ORNAMENTAL AQUARIUM
Filed Oct. 24, 1949 — 3 Sheets-Sheet 1

Fred Y. Kuriyama
INVENTOR.

BY Clarence A. O'Brien
and Harvey B. Jacobson
Attorneys

April 29, 1952 — F. Y. KURIYAMA — 2,595,085
ORNAMENTAL AQUARIUM
Filed Oct. 24, 1949 — 3 Sheets-Sheet 2

Fred Y. Kuriyama
INVENTOR.

BY Clarence A. O'Brien
and Harvey B. Jacobson
Attorneys

April 29, 1952   F. Y. KURIYAMA   2,595,085
ORNAMENTAL AQUARIUM
Filed Oct. 24, 1949   3 Sheets-Sheet 3

Fred Y. Kuriyama
INVENTOR.

BY Clarence A. O'Brien
and Harvey B. Jacobson
Attorneys

Patented Apr. 29, 1952

2,595,085

UNITED STATES PATENT OFFICE 2,595,085

ORNAMENTAL AQUARIUM

Fred Y. Kuriyama, Waianae, Oahu,
Territory of Hawaii

Application October 24, 1949, Serial No. 123,143

4 Claims. (Cl. 119—5)

My invention relates to improvements in ornamental aquariums for household use especially, although not necessarily.

The primary object of my invention is to provide an aquarium of ornamental appearance in which growing plants enhance the appearance of the same by display of the plants outside the aquarium without obstructing the view thereof and of the contents of the same.

Another object is to provide a device of the character and for the purpose set forth which is constructed and arranged for ready access thereto to clean the same and take proper care of the plants and the contents of the aquarium.

Still another object is to provide an ornamental aquarium adapted for growing plants other than marine plants, and which is of simple, practical construction, easy to take apart and put together, and comparatively inexpensive to manufacture.

Other and subordinate objects, within the purview of my invention, together with the precise nature of my improvements, will be readily understood when the succeeding description and claims are read with reference to the drawings accompanying and forming part of this specification.

Figure 1:
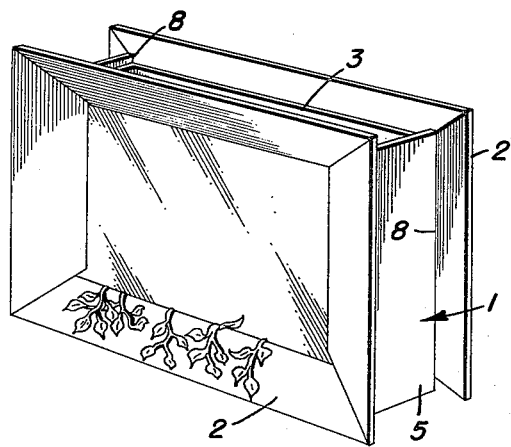
Figure 1 is a view in perspective of my improved aquarium in a preferred embodiment thereof.
Figure 2:
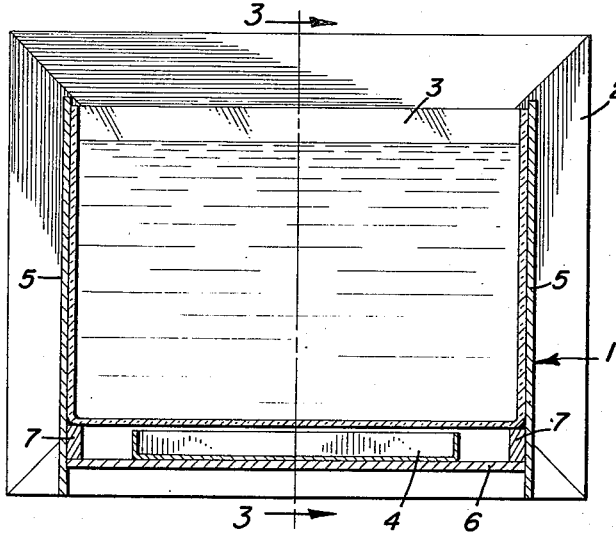
Figure 2 is a view in vertical longitudinal section taken on the line 2—2 of Figure 3 and drawn to a larger scale.
Figure 3:
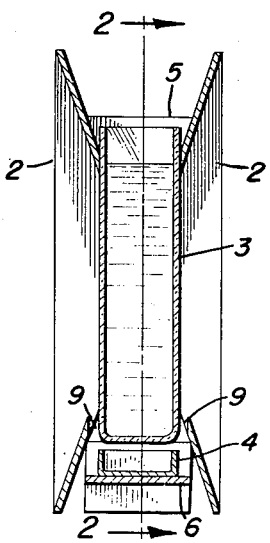
Figure 3 is a view in transverse section taken on the line 3—3 of Figure 2.

Referring to the drawings by numerals, and first to Figures 1 to 3, in the preferred embodiment thereof, my improved aquarium comprises a substantially U-shaped support 1 for a pair of side frames 2, a water tank 3 and a plant box 4. The support 1 embodies a pair of upright elongated end panels 5 connected, in any suitable manner, adjacent the lower ends, by a horizontal bottom panel 6 of the same width as said end panels 5. Cross cleats 7 on the top of the horizontal bottom panel 6, at the ends thereof, brace said support and serve the further purpose presently explained. The panels 5 and 6 and the cleats 7 may be formed of any suitable light, strong material.

The side frames 2 are each of open, rectangular, dished form and are suitably fixed to the vertical side edges 8 of the end panels 5 to extend into said support 1 and flare outwardly thereof. As best shown in Figure 3, the side frames 2 are level with the lower ends of the end panels 5 and completely hide the support 1 at opposite sides thereof. Also, as shown in Figure 3, the side frames 2 are spaced apart equidistantly upon opposite sides of the vertical longitudinal center of the support 1, and for a purpose presently seen.

The water tank 3 is of flat rectangular form, and any suitable transparent material, and is removably fitted between the side frames 2 and the end panels 5, with bottom corners seated on the cross cleats 7 to space said tank above the bottom panel 6.

The plant box 4 is of elongated rectangular form and removably seated on the bottom panel 6. In order that the plant box 4 may be inserted between the side frames 2 onto the bottom panel 6, said box is narrower than the space between said frames.

As best shown in Figure 3, the plant box 4 is shallower than the space between the bottom of the water tank 3 and the bottom panels 6, and at the bottoms of the side frames 2, the inner edges thereof are spaced outwardly of the sides of the water tank 3 for a purpose presently explained. The inner edges of the side frames 2 overlap the vertical and horizontal corners of the water tank 3 so that said frames frame said tank and conceal the top, bottom, and ends thereof.

In using the described aquarium, the same is stood on a support with the lower ends of the end panels 5 and the bottom edges of the side frames 2 resting thereon. The water tank 3 is used in the usual manner. Plants are grown in the plant box 4 to project out of the spaces 9 between the sides of the water tank 3 and the inner bottom edges of the side frames 2. As illustrated in Figure 1, such plants will hang downwardly out of the side frames 2 and form an ornamental growth along the bottom of the aquarium. The water tank 3 may be lifted out of the support 1 from between the side frames 2 for refilling and replacement, and said tank may be so removed, also the plant box 4, for cleaning out or any other purposes.

Figure 4:
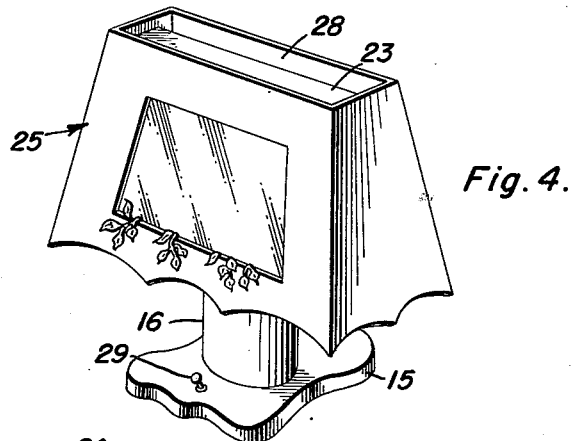
Figure 4 is a view in perspective of a modified embodiment of my improved aqarium.
Figure 5:
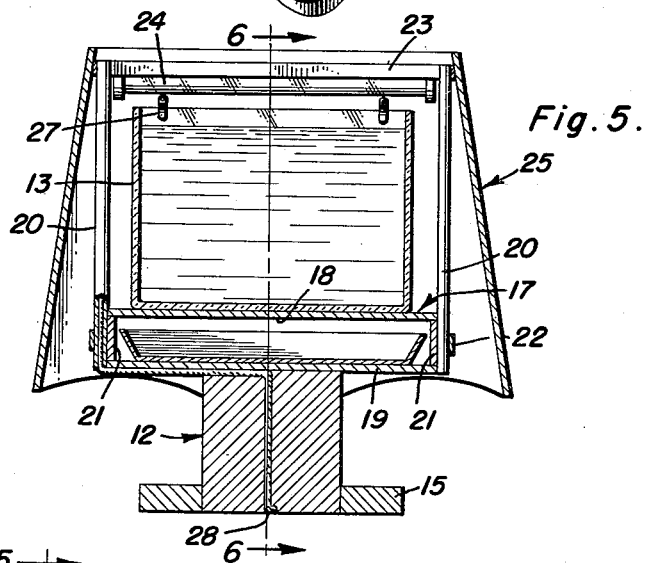
Figure 5 is a view in vertical longitudinal section of the same taken on the line 5—5 of Figure 6 and drawn to a larger scale.
Figure 6:
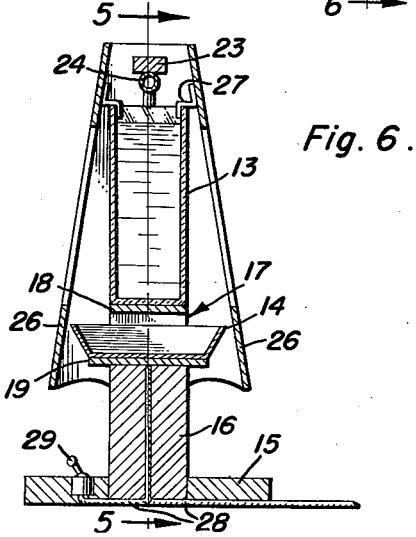
Figure 6 is a view in transverse section taken on the line 6—6 of Figure 5.
Figure 7:
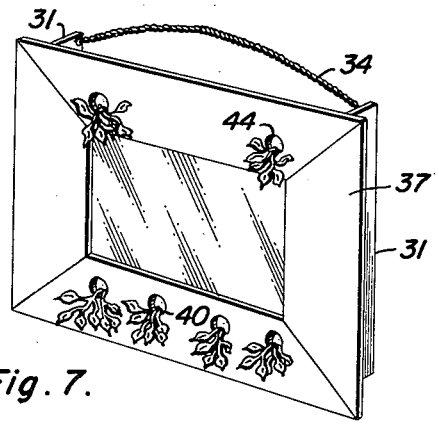
Figure 7 is a view in perspective of a second modified embodiment of my improved aquarium.
Figure 8:
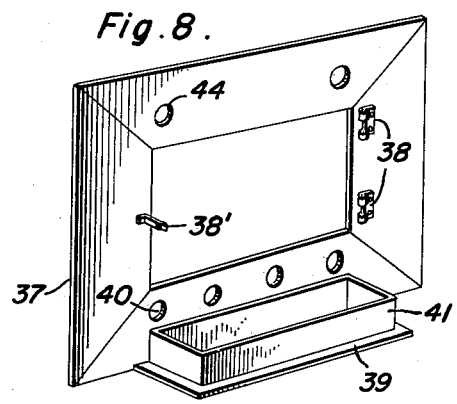
Figure 8 is a view in perspective of the front frame and parts carried thereby.
Figure 9:
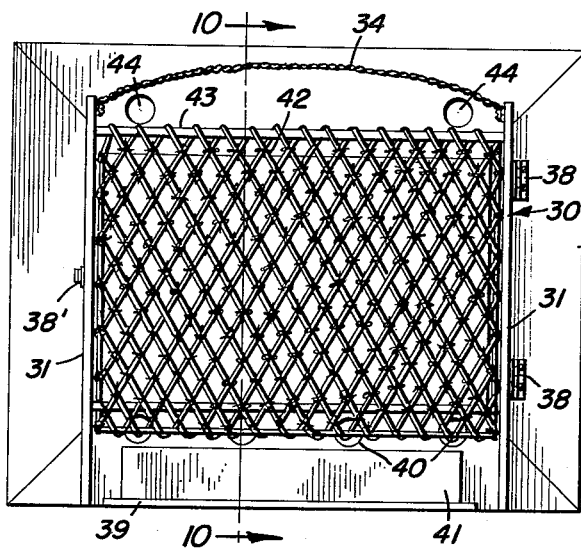
Figure 9 is a view in rear elevation drawn to a larger scale.
Figure 10:
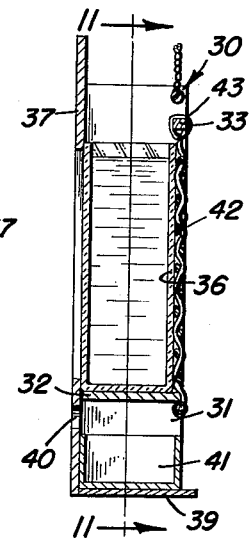
Figure 10 is a view in transverse section taken on the line 10—10 of Figure 9.
Figure 11:
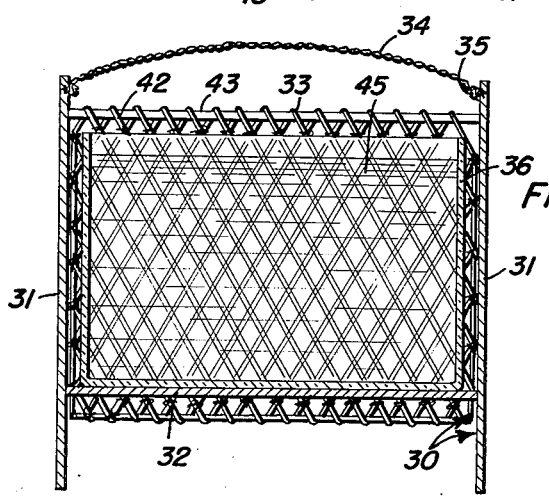
Figure 11 is a view in vertical longitudinal section taken on the line 11—11 of Figure 9.

In the modified embodiment of the aquarium shown in Figures 4, 5 and 6, the same has the form of a table lamp with a support 12 for a water tank 13 and a plant box 14.

The support 12 comprises a base 15 having a pedestal 16 rising therefrom. An elongated, rectangular frame 17, open at its sides, with a top panel 18 and a relatively wider bottom panel 19, is centered horizontally on and suitably secured to said pedestal 16. The base 15, pedestal 16, and frame 17 may be formed of any suitable material. A pair of tubular uprights 20 rise from opposite ends 21 of the frame 17 with lower ends fixed in suitable keepers 22 on said ends 21. A conventional fluorescent lamp fixture 23 connects the upper ends of the uprights 20 with the usual fluorescent light tube 24 extending along the bottom of the fixture.

The water tank 13 is of flat rectangular shape and any suitable transparent material and is seated flat on the top panel 18 of the frame 17 between the uprights 20, said tank extending longitudinally of said frame 17. For a purpose presently apparent, the water tank 13 is preferably of the same width as the top panel 18 of the frame 17.

The plant box 14 is of elongated rectangular form and seats in the frame 17 on the bottom panel 19 to extend longitudinally thereof. For a purpose presently seen, the plant box 14 is wider than the top panel 18, and the water tank 13, to project beyond the sides of the top panel and tank.

A downwardly flaring shade 25 is provided for suspension from the rim of the water tank 13. The shade 25 comprises a pair of downwardly diverging side frames 26 open opposite the sides of the water tank 13, solely, to frame said tank at the sides thereof and render the contents visible from the sides of the aquarium. Internal hooks 27 on the side frames 26 fit over the rim of the water tank 13 and suspend said shade 25 from said rim. The upper portion of the shade 25 circumscribes the lamp fixture 23 and light tube 24 to conceal the same and the lower portion of said shade similarly conceals the frame 17 and plant box 14.

Electric wiring 28 extends into the pedestal 16 and through one tubular upright 20 and is connected in the conventional manner, not shown, to the fluorescent light tube 24 for energizing the same from a house circuit to which said wiring may be connected in the usual manner. A suitable switch 29 is provided in the base 15 and in the wiring 28 for closing circuit to said light tube 24.

In using the modified embodiment of my aquarium, the shade 25 frames the water tank 13 at the sides thereof for ornamentation, and plants grown in the plant box 14 may be trained to project out of the side frames 26 along the bottom of the water tank 13 for further ornamentation. With the fluorescent light tube lighted, water in the water tank 13 is illuminated to further enhance the ornamental appearance in the aquarium and provide illumination in a room or the like.

The second modified embodiment of the aquarium, shown in Figures 7 to 11, is a hanging wall aquarium, the basic element of which is a water tank support 30 comprising a pair of upright elongated end panels 31 connected together adjacent the lower ends thereof by a horizontal bottom panel 32 of the same width. A rear, upper, horizontal bar 33 also connects said end panels 31 together. A cord, or the like, 34 is connected, as at 35, to the rear upper corners of said end panels 31 for hanging the support 30 on a wall, not shown.

The water tank 36, in this instance, is also of rectangular flat form and any suitable transparent material and is seated on the bottom panel 32 between the end panels 31 to extend longitudinally of the support 30.

A rectangular front frame 37 for the water tank 36, higher and wider than the support 30, is hinged at one side and on the rear face thereof to one end panel 31, as at 38, to be swung open and closed against the front of said support. The frame 37, when closed, conceals the support 30 from view from the front thereof and overlaps the front edges of the tank 36 to frame the same. A suitable spring catch 38' yieldingly retains said frame 37 closed. A rearwardly extending horizontal shelf 39 is suitably fixed on the bottom edge of the frame 37 and a horizontal row of apertures is provided in said frame 37 directly below the bottom panel 32, all for a purpose presently seen.

An elongated rectangular plant box 41 of substantially the same width as the shelf 39 and the end panels 31 is removably seated on said shelf below the bottom panel 32 and the row of apertures 40.

A net panel 42 is suitably hung, as at 43, on the bar 33 for draping behind the water tank 36.

Apertures 44 in the frame 37 above the water tank 36 are provided for training aquatic plants, growing in water in said tank, outwardly through said frame.

In the use of the second modified embodiment of my aquarium, the water tank 36, as in the other embodiments, is framed by the frame 37. The net panel 42 behind the water tank 36, when viewed through water 45 in said tank, produces an unusual ornamental effect. Plants, not shown, grown in the plant box 41 and trained out of the apertures 40, together with aquatic plants, now shown, grown in the water 45 and trained out of the openings 44, lend further ornamentation to the aquarium at the top and bottom thereof. By opening the frame 37, access may be had to the water tank 36 for removing and/or filling the same, and the plant box 41 may be swung outwardly away from the support 30 for access thereto as may be required.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described the invention, what is claimed as new is:

1. In a combination table lamp and ornamental aquarium, a support comprising a pair of upright end members, a rectangular transparent water tank mounted on said support to extend longitudinally between said members, a tubular light fixture supported at its ends by said members to extend along the top of said tank and illuminate the tank through the water to diffuse dim light rays outwardly from the tank, and a shade suspended from the rim of said tank and concealing said fixture, said shade having side openings therein opposite the sides of said tank to render the tank clearly visible and provide for the escape outwardly of the shade of light rays diffused from the sides of the tank.

2. In a combination table lamp and ornamental aquarium, a support comprising a pair of upright end members, a rectangular transparent water tank mounted on said support to extend longitudinally between said members, a tubular light fixture supported at its ends by said members to extend along the top of said tank and illuminate the tank through the water to diffuse dim light rays outwardly of the tank, a shade suspended from the rim of said tank and concealing said fixture, said shade having side openings therein opposite the sides of said tank to render the tank clearly visible, and a pedestal for elevating said support and provide for the escape outwardly of said shade of the light rays diffused from the sides of the tank.

3. In a combination table lamp and ornamental aquarium, a pedestal, and elongated plant box above said pedestal for growing plants therein, a transparent water tank above said box, means on said pedestal supporting said box and tank, said box extending outwardly beyond the sides of said tank for growing plants therein to extend upwardly alongside the tank, a tubular light fixture, and means rising from said first-named means and supporting said fixture horizontally above said tank to illuminate the tank through the water wherein to diffuse dim light rays outwardly of the sides of the tank for illuminating the plants extending alongside the tank, and a shade suspended from the rim of the tank and having openings therein for rendering said tank and plants visible and providing for the escape outwardly of the shade of light rays diffused outwardly of the tank.

4. In a combination table lamp and ornamental aquarium, a pedestal, an elongated plant box above said pedestal for growing plants therein, a transparent water tank above said box, means on said pedestal supporting said box and tank, said box extending outwardly beyond the sides of said tank for growing plants therein to extend upwardly alongside the tank, a tubular light fixture, and means rising from said first-named means and supporting said fixture horizontally above said tank to illuminate the tank through the water therein to diffuse dim light rays outwardly of the sides of the tank for illuminating the plants extending alongside the tank.

FRED Y. KURIYAMA.

REFERENCES CITED

The following references are of record in the file of this patent:

UNITED STATES PATENTS

| Number | Name | Date |
|---|---|---|
| D. 41,977 | Jacob | Dec. 12, 1911 |
| 460,810 | Gunther | Oct. 6, 1891 |
| 919,157 | Glaser | Apr. 20, 1909 |
| 1,263,391 | Eickmeyer | Apr. 23, 1918 |
| 1,974,068 | Greensaft | Sept. 18, 1934 |
| 2,144,551 | Skolnick | Jan. 17, 1939 |